May 1, 1934. L. J. BERKELEY 1,957,090
CONTROLLING VALVE DEVICE
Original Filed May 20, 1930

INVENTOR
LAURENCE J. BERKELEY.
BY Wm. M. Cady
ATTORNEY

Patented May 1, 1934

1,957,090

UNITED STATES PATENT OFFICE 1,957,090

CONTROLLING VALVE DEVICE

Laurence J. Berkeley, Cleveland, Ohio

Application May 20, 1930, Serial No. 453,984
Renewed September 13, 1933

8 Claims. (Cl. 251—102)

This invention relates to controlling valve devices, and more particularly to a gas controlling valve device for gas stoves and the like.

One object of my invention is to provide a controlling valve device which is not affected by heat.

Another object of my invention is to provide a controlling valve device in which the valve members are automatically adjusted as wear occurs.

Another object is to provide a controlling valve device which does not require lubrication, which is particularly desirable where the valve device is employed in a location, such as on a gas stove, in which the valve device is subject to heat.

Other objects and advantages will appear in the following more detailed description of the invention.

Figure 1:
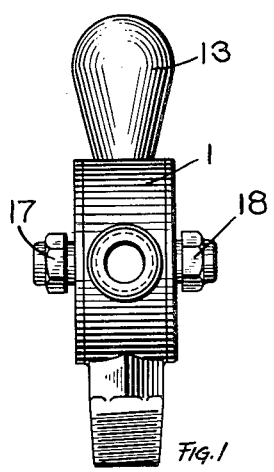
Figure 2:
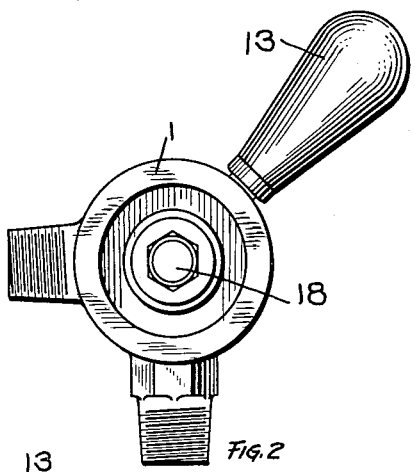
Figure 3:
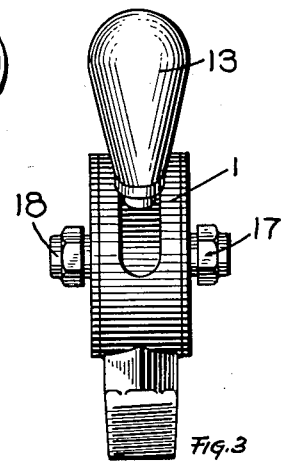
Figures 4, 5, 6:
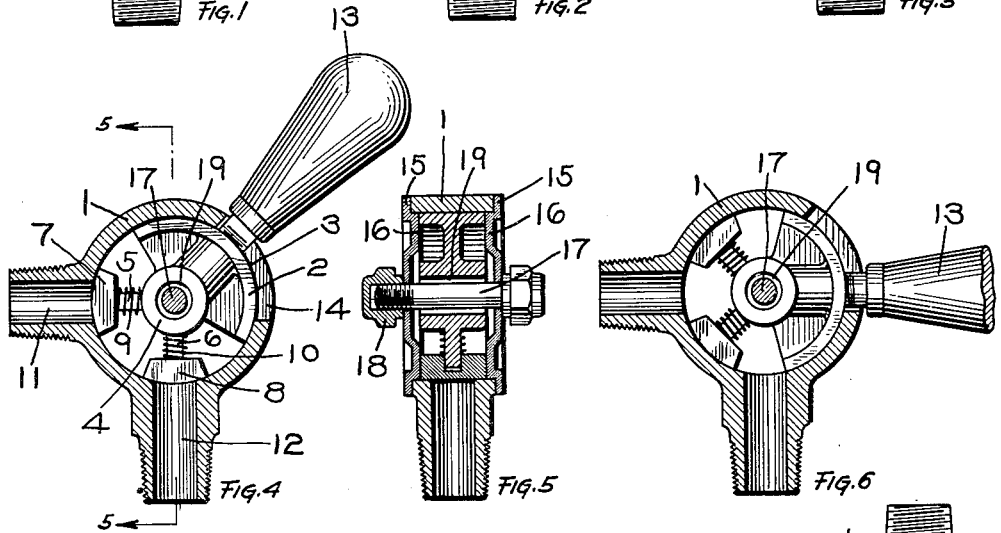
Figure 7:
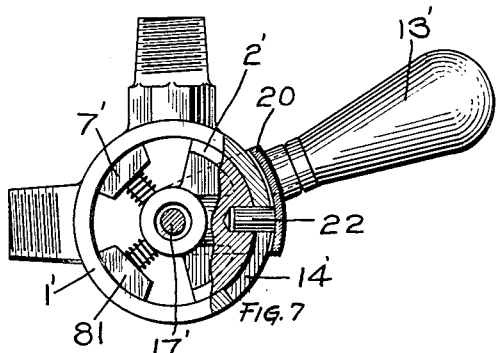
Figures 8, 11:
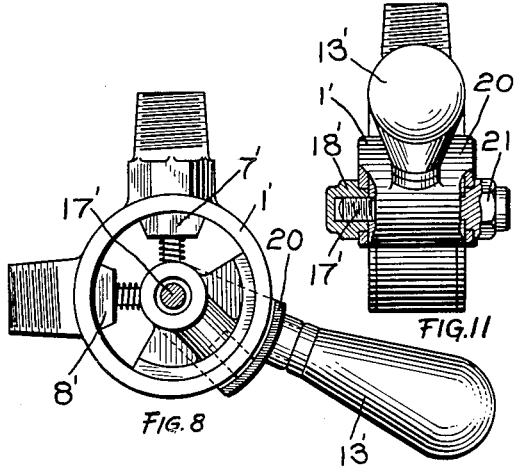
Figures 9, 10:
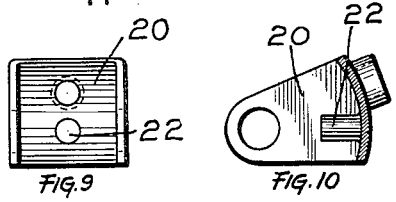

In the accompanying drawing; Figs. 1, 2 and 3 are elevational views, in different planes, of a controlling valve device embodying my invention; Fig. 4 is a central sectional view of the controlling valve device; Fig. 5 a section on the line 5—5 of Fig. 4; Fig. 6 a central section of the controlling valve device showing the operating handle in another position from that shown in Fig. 4; Fig. 7 a face view, with a cover plate removed, and partly in section, of a slightly modified form of controlling valve device; Fig. 8 a view similar to Fig. 7 of the modified form, showing the handle in another position; Fig. 9 an interior view of the handle yoke; Fig. 10 a sectional view of the handle yoke; and Fig. 11 an elevational view of the valve device shown in Figs. 7 and 8.

The controlling valve device shown in Figs. 1 to 6 comprises a body member 1 having a cylindrical bore in which is mounted a handle segment 2 having a bearing face 3 adapted to engage the interior wall of the cylindrical bore. Said segment is provided with a centrally disposed hub 4 having preferably integral pins 5 and 6, which extend respectively into recesses provided in valve segments 7 and 8, the segments 7 and 8 having valve faces which bear against the interior wall of the cylindrical bore in the body member 1.

Coil springs 9 and 10 are mounted on the pins 5 and 6 between the hub 4 and the valve segments 7 and 8, and a clearance space is provided between the end of each pin and the bottom of the corresponding recess in the valve segment.

The valve segments 7 and 8 control ports 11 and 12, one of which may be an inlet port and the other an outlet port. A handle 13 is secured to the segment 2 and extends through a slot 14 in the body member 1, the slot permitting movement of the handle to operate the valve segments.

Disks 15, preferably in the form of stampings, are provided for closing the opposite sides of the body member 1, each disk having an annular guide flange 16 which fits into the cylindrical bore of the body member 1. The disks 15 are clamped in place by means of a bolt 17 and a nut 18, the bolt 17 extending through a central bore 19 in the hub 4.

In Fig. 4, the valve segments 7 and 8 are shown as closing the ports 11 and 12, and in Fig. 6 the valve segments are shown in the open position, in which gas can flow from one port to the other.

The springs 9 and 10 act to yieldingly press the valve segments against the annular valve seat in the valve body, so that the frictional resistance to movement is maintained practically constant and so that wear is automatically taken up. The yielding character of the construction also prevents any rocking of the valve segments away from the valve seat by movement of the operating handle. The construction requires no lubrication and is not affected by heat.

Any number of ports may be provided, together with any number of corresponding valve segments, and the ports may be arranged in any desired positions.

In the modified form of controlling valve device shown in Fig. 7 to 11 of the drawing, the handle 13' is carried by a yoke 20, which is adapted to straddle the body member 1' and which is rotatably mounted on bearings provided on the head 21 of the bolt 17' and the nut 18', as shown in Fig. 11.

Th yoke caries an inwardly extending pin 22, which is adapted to engage in a recess provided in the segment 2', as shown in Fig. 7. This arrangement permits the positioning of the handle 13' out of line with the slot 14', when desired or necessary.

My improved controlling valve device can be cheaply manufactured and will operate at all times freely and easily, without lubrication and without being affected by heat.

While one illustrative embodiment of the invention has been described in detail, it is not my intention to limit its scope to that embodiment or otherwise than by the terms of the appended claims.

Having now described my invention, what I claim as new and desire to secure by Letters Patent is:—

1. A controlling valve device comprising a valve body having a cylindrical valve chamber provided with an opening in the cylindrical wall thereof, a valve segment seating on the cylindrical wall of said chamber, a movable member closing said opening in all positions of said member for actuating said valve segment, and a handle carried by said member and projecting through said opening.

2. A controlling valve device comprising a valve body having a cylindrical valve chamber formed with an opening in the wall thereof, a valve segment and a handle segment seating on the cylindrical wall of said chamber, said handle segment closing said opening, an operating connection between said segments, a spring for yieldingly pressing said valve segment and said handle segment into engagement with said cylindrical wall, and a handle extending through said opening and connected to said handle segment.

3. A controlling valve device comprising a valve body having a cylindrical valve chamber provided with a slot, a rotatable handle segment seating on the cylindrical wall of said chamber and closing said slot, a plurality of valve segments seating on said wall and operatively connected to said handle segment, said valve segments being adapted for radial movement relative to said handle segment, means for yieldingly pressing said valve segments and said handle segment into engagement with said wall, and a handle carried by said handle segment and extending through said slot.

4. A controlling valve device having a cylindrical valve chamber provided with a slot in the wall thereof, a rotatable handle segment seating on the cylindrical wall of said chamber and closing said slot, radially extending pins carried by said segment, valve segments seating on said wall and operable by said pins, and a handle for operating said handle segment and extending through said slot.

5. A controlling valve device comprising a valve body having a cylindrical valve chamber provided with an opening in the wall thereof, a rotatable handle segment seating on the cylindrical wall of said chamber and closing said slot, radially extending pins carried by said segment, valve segments seating on said wall and having recesses into which said pins extend, and a handle extending through said opening for operating said handle segment.

6. A controlling valve device comprising a valve body having a cylindrical valve chamber provided with a slot in the wall thereof, a rotatable handle segment seating on the cylindrical wall of said chamber, radially extending pins carried by said segment, valve segments seating on said wall and operable by said pins, a spring mounted on each pin and interposed between the handle segment and each valve segment for maintaining said segment in frictional contact with said wall, and a handle carried by said handle segment and extending through said slot.

7. A controlling valve device comprising a valve body having an open ended cylindrical valve chamber, valve segments mounted in said chamber, a cover plate closing each open end of said chamber, a single bolt extending coaxially through said chamber in spaced relation to said segments for clamping said plates to the valve body, and a handle for operating said valve segments.

8. A controlling valve device comprising a valve body having an open ended cylindrical valve chamber, a rotatable handle segment mounted in said chamber, one or more valve segments mounted in said chamber and operatively connected to said handle segment, cover plates closing the open ends of said chamber and a single bolt extending through said chamber for clamping said plates to the valve body.

LAURENCE J. BERKELEY.